United States Patent [19]

Hoppner et al.

[11] 4,026,020
[45] May 31, 1977

[54] GUIDING RAIL ARRESTING DEVICE FOR MOTOR DRIVEN SAWS

[75] Inventors: Klaus Höppner, Marbach (Neckar); Götz Landwehr, Korb; Adolf Wilhelm, Backnang-Steinbach; Wolfgang Meyer, Waiblingen; Gerd Frers, Weinstadt; Rolf Lohberg, Holzgerlingen; Dieter Reiff, Waiblingen; Karl Förderer, Korb; Helmut Kosiollek, Korb, all of Germany

[73] Assignee: Andreas Stihl Maschinenfabrik, Neustadt, Germany

[22] Filed: Mar. 3, 1976

[21] Appl. No.: 663,294

[30] Foreign Application Priority Data

Mar. 5, 1975 Germany .......................... 2509158

[52] U.S. Cl. ................................................. 30/386
[51] Int. Cl.² ......................................... B27B 17/02
[58] Field of Search ............ 30/383, 384, 385, 386, 30/387, 381, 382

[56] References Cited

UNITED STATES PATENTS

| 2,348,612 | 5/1944 | Deacon | 30/387 X |
| 2,527,251 | 10/1950 | Gorden | 30/385 |

Primary Examiner—Al Lawrence Smith
Assistant Examiner—J. C. Peters
Attorney, Agent, or Firm—Walter Becker

[57] ABSTRACT

A guiding rail arresting device for motor driven hand saws, especially motor chain saws, in which a sword-shaped guiding rail provided with a guiding groove extending in the longitudinal direction of the guiding rail is adapted to be clamped transverse to the plane of said rail against an abutment having associated therewith a counter guiding member for cooperation with the flanks of the guiding groove. The counter guiding member for at least one of the groove flanks is formed by a supporting element adapted when clamping the rail against the abutment automatically to be clamped against the groove flank.

17 Claims, 7 Drawing Figures

GUIDING RAIL ARRESTING DEVICE FOR MOTOR DRIVEN SAWS

The present invention relates to arresting means for guiding rails on motor-driven hand saws, especially motor chain saws, in which the sword-like guiding rail which is provided with a guiding groove extending in the longitudinal direction of the saw is adapted to be braced in the direction transverse to the plane of the rail with regard to an engaging body which has associated therewith counter guiding means which cooperate with the flanks of the guiding groove.

With heretofore known guiding rail arresting means of this type, as counter guiding means there is employed a guiding bolt or guiding strip which engages the guiding groove and the flanks of which together with the flanks of the guiding groove are intended to assure a possibly play-free guiding of the guiding rail. In view of the required displaceability of the guiding rail, for instance for post-tensioning the chain, and also in view of the machining tolerances, a certain tolerance play between the guiding strip and the guiding groove is unavoidable. This fact, in view of the short length of the guiding strip, causes noticeable offsetting of the rail and particularly when a rail adjusting device is provided the point of rotation of which is offset with regard to the guiding groove. In such an instance, during the pivoting movement, the play between chain and rail changes whereby in an unfavorable instance between these elements a preload may occur which brings about a running hot of the chain.

Without a chain tensioning device, with heretofore known constructions, the pretensioning force of the rail connecting elements is insufficient to safely absorb axial forces which occur during the sawing operation. With saws of this type working without tensioning device, an uncontrolled axial displacement of the rail may occur as a result of which the play between chain and rail changes.

It is, therefore, an object of the present invention to provide a guiding rail arresting structure which will overcome the above mentioned drawbacks and in which by simple means a play-free arresting will be assured while permitting an easy installation and a simple axial displaceability for the guiding rail.

This object and other objects and advantages of the invention will appear more clearly from the following specification in connection with the accompanying drawings in which:

FIG. 1 diagrammatically illustrates a side view of a motor chain saw according to the invention in which the sprocket wheel cover is not shown.

The guiding rail arresting structure according to the present invention is characterized primarily in that the counter guiding means for at least one of the groove flanks is formed by at least one supporting element which during the bracing of the rail against an abutment is adapted to be braced automatically against the groove flank. Thus, according to the invention, as counter guiding means for at least one of the groove flanks of the guiding groove there is employed a supporting element in the manner of a clamping member which due to a pressing-on force exerted by the connecting elements bringing about the clamping of the guiding rail against the abutment, for instance the motor housing, automatically eliminates the tolerances between the guiding groove of the rail and the counter guiding means as they are caused by the manufacturing process, while the counter guiding means for the second groove flank may in a customary manner be formed by a guiding strip or also by one or more guiding bolts.

The supporting element which forms the counter guiding means for at least one of the groove flanks may be spring-urged in the direction toward its starting position from which it is offset when clamping the rail against the abutment in order for an adjustment of the guiding rail to have to loosen only the clamping thereof with regard to the abutment. Due to the fact that within the scope of the present invention preferably a pivotably mounted supporting element is employed the pivot axis of which in the clamping direction is offset behind the abutment surface of the guiding rail and laterally with regard to the groove flank respectively cooperating with the supporting element, the supporting element acts as a lever. This lever exerts such a great force upon the guiding rail that an accidental axial displacement will be impossible. It is a matter of course that also any play will be eliminated so that undesired pivotal movements of the guiding rail will be impossible. In order to obtain a very satisfactory rail support, the supporting element may be resilient or a different material may be used for the supporting element which material will elastically yield when subjected to pressure.

Figure 1:
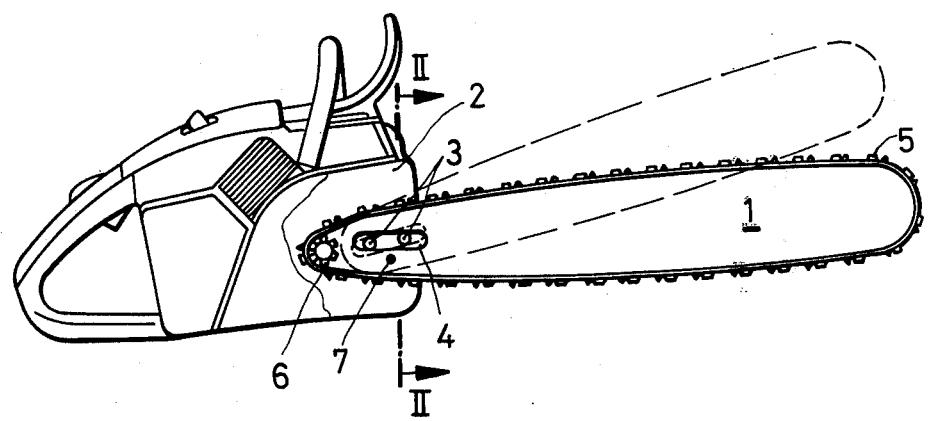

Referring now to the drawings in detail, with the motor chain saw illustrated in FIG. 1, the sprocket wheel cover is removed for a better illustration of the invention. As will be seen from FIG. 1, the guiding rail 1 is by means of two guiding bolts 3 connected to the motor housing 2 acting as abutment surface. These guiding bolts are associated with the guiding groove 4 of the guiding rail 1 as counter guiding means. Mounted on the guiding rail 1 is a chain 5 which is circulated by means of the sprocket wheel 6. The play between the chain 5 and the guiding rail 1 is set by means of a chain tensioning device not shown in detail in the drawings. Of this chain tensioning device, the suspension point 7 acts as pivot point for the guiding rail 1 if the guiding bolt 3 permits a play relative to the guiding groove 4. If such play exists, it will be appreciated that, as indicated in FIG. 1 by dash lines, a pivoting movement for the guiding rail 1 will bring about a change in the position of the guiding rail relative to the chain and, more specifically, with a corresponding axial movement on the chain deviating point. This pivoting movement for the guiding rail 1 occurs in view of the fact that the suspension point 7 serves as pivot point and does not coincide with the axis of rotation of the sprocket wheel 6. Such dislocation of the guiding rail relative to the chain may, as stated above, bring about an undesired preload between the chain and the rail and thereby may cause the chain to run hot.

The above mentioned play between the guiding bolts and the guiding groove is eliminated by the guiding rail arresting means according to the invention. Such an arresting, as it will be described further below in connection with FIGS. 2-7, at the same time also brings about an absolutely safe axial clamping of the guiding rail relative to the motor housing which in this instance serves as abutment or engaging wall.

Figure 2:
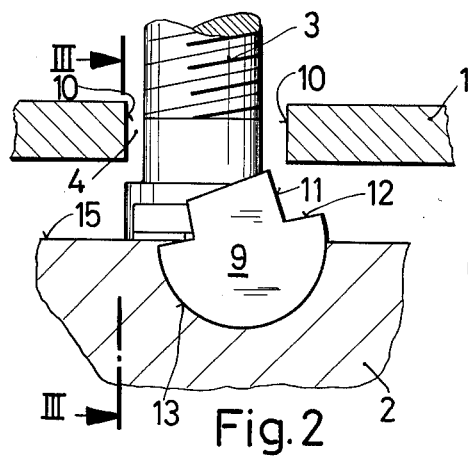
FIG. 2 illustrates in section and on a larger scale than that of FIG. 1 a cutout of a guiding rail arresting structure according to the invention, said section being taken along the line II — II of FIG. 1.
Figure 3:
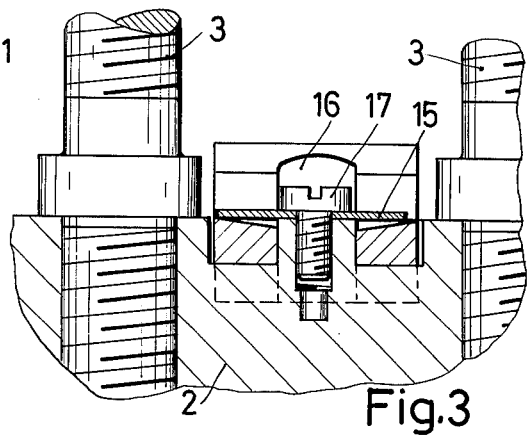
FIG. 3 represents a section taken along the line III — III of FIG. 2.
Figure 4:
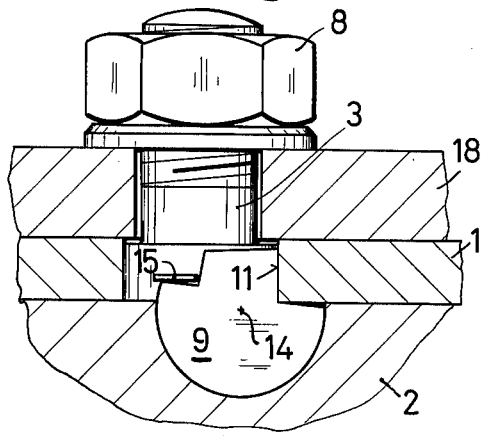
FIG. 4 illustrates in a manner similar to that of FIG. 2 the bracing of the guiding rail while the latter is arrested by means of the arresting device according to the invention.

In FIGS. 2-4 which illustrate a first embodiment of the invention, the motor housing 2 again serves as abutment relative to which the guiding rail 1 is to be clamped. The guiding rail 1 has a guiding groove 4 into which in this instance extend guiding bolts 3 serving as component of the counter guiding means. By means of the guiding bolts 3 in cooperation with corresponding nuts 8, the clamping of the guiding rail 1 against the abutment, in other words against the motor housing 2, is effected. As further part of the counter guiding means serves a supporting element which in this instance is formed by a pivotable strip 9. This supporting element is associated with a groove flank 10 having a supporting surface 11 which extends at an angle with regard to a clamping surface 12. It is this clamping surface 12 which is engaged by the guiding rail 1 when the latter first abuts the motor housing serving as abutment. In this connection the pivotable strip 9 is located in a semicircular groove 13 of the housing 2 is pivoted in clockwise direction when viewing FIGS. 2 and 4 so that the supporting surface 11 engages the groove flank 10. With the clamping of the guiding rail 1 relative to the motor housing 2, a clamping of the guiding rail 1 is obtained. In connection therewith, the groove flanks of the guiding groove have as counter guiding means associated therewith on the one hand the supporting bolts 3 and on the other hand the supporting surface 11 of the pivotable strip 9. Due to the offsetting of the latter during the clamping of the rail 1 with regard to the abutment, i.e. in this instance the motor housing, any play will be eliminated.

In particular FIG. 3 shows that the pivotable strip the pivot axis 14 of which is located behind the abutment surface 15' for the guiding rail, when looking in the clamping direction, is in the direction toward its starting position shown in FIG. 2 springloaded by a spring 15. This spring within the region of a corresponding recess 16 in the longitudinal central region of the pivotable strip is connected to the motor housing 2 by means of a screw 17. The ends of spring 15 which are located on both sides of screw 17 rest on corresponding surface sections of strip 9 on the clamping surface 12, strip 9 having an overall mushroom-shaped cross section.

Figure 5:
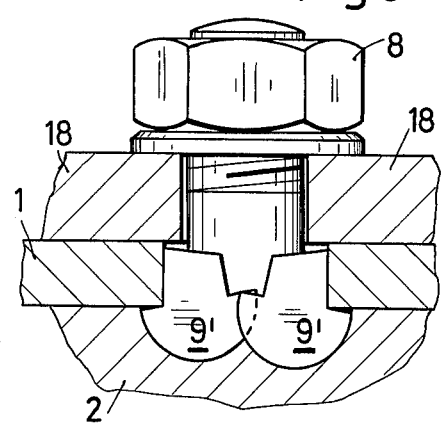
FIG. 5 illustrates in a manner similar to that of FIG. 4 a modification of the invention according to which the two groove flanks of the guiding groove which are located opposite to each other respectively have a supporting element associated therewith.

According to the embodiment shown in FIG. 5, the counter guiding means for both groove flanks 10 of the guiding groove 4 is respectively formed by supporting elements 9' as has been described in connection with FIGS. 2-4. The two supporting elements designed as pivotable strips are during the clamping of the guiding rail 1 moved toward the motor block with their supporting surfaces facing in opposite direction, respectively outwardly in the direction toward the corresponding groove flank, so that also in this instance an absolutely play-free bracing or clamping will be assured.

The pressing of the guiding rail 1 against the motor block 2 is effected in the above mentioned manner while, as already mentioned in connection with FIG. 4, between the nut 8 and the guiding rail 1 there is illustrated the cover part. With the embodiment according to FIG. 5, the employed screw bolts have no longer any guiding function with regard to the guiding rail 1 and, therefore, the bracing of the cover 18 and through the latter also of the guiding rail 1 may, of course, also be effected in any other suitable manner.

Figure 6:
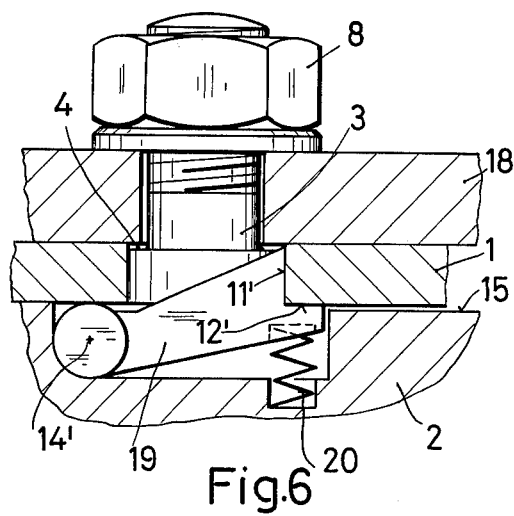
FIG. 6 illustrates similar to FIGS. 4 and 5 a further embodiment of the guiding rail arresting structure according to the invention in which the supporting element is formed by a pivotable lever.

FIG. 6 shows an embodiment in which as supporting element a pivotable lever 19 is provided the pivot axis of which is designated with the reference numeral 14'. With regard to the location of the pivot axis 14', also in this instance this axis is located below the abutment surface 15' for the guiding rail 1 and is offset relative to the groove edge 10 in the direction toward the other groove edge of the guiding groove 4, the groove edge 10 cooperating with the supporting surface 11' of the pivotable lever. Also the last mentioned lever is provided with a bracing surface 12' so that this lever, when the guiding rail 1 is braced against the motor block 2, will be carried along against the thrust of spring 20 and will pivot about the axis 14'. As a result thereof the desired bracing of the guiding rail relative to the guiding bolt 3 on the one hand and the supporting surface 11' of the pivotable lever 19 on the other hand will be assured.

Figure 7:
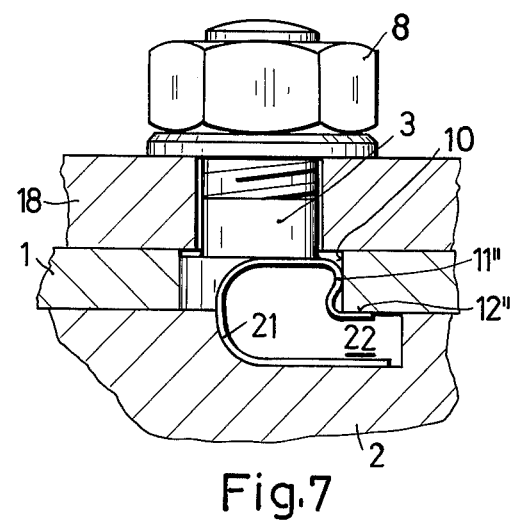
FIG. 7 shows a still further embodiment of the invention in which as supporting element a spring element is provided.

According to the embodiment of FIG. 7 which principally corresponds to those mentioned above, a spring element 21 of U-shaped cross section is employed as supporting element. The spring element 21 is partially, i.e. with its lower leg, located in a recess 22 of the motor housing 2. Due to this countersunk arrangement, which corresponds to that of the above described embodiments, a path of movement is obtained for the upper leg 23 of the U-shaped spring within the framework of the structurally predetermined spring stroke. This path of movement with regard to the supporting surface 11'' and the bracing surface 12'' associated therewith corresponds to that described above in connection with the preceding figures. Also with this spring construction, consequently a play-free support of the guiding rail is obtained, when the guiding rail 1 is braced against the motor housing 2, due to a corresponding cooperation of the supporting surface 11'' with the corresponding groove edge. In this instance as element of the counter guiding means which acts opposite to the supporting surface 11''', a guiding bolt 3 is provided. It is, of course, also possible with the embodiments of FIGS. 6 and 7 to form the counter guiding means for both groove flanks by corresponding supporting elements.

It is, of course, to be understood that the present invention is, by no means, limited to the specific showing in the drawings but also comprises any modifications within the scope of the appended claims.

What we claim is:

1. A motor driven hand saw, especially motor chain saw, which comprises in combination: a guiding rail with a guiding groove extending in the longitudinal direction of said rail, abutment means, clamping means for clamping said rail against said abutment means in a direction transverse to the plane of said rail, and counter guiding means associated with said abutment means for cooperation with the flanks of said guiding groove, said counter guiding means including for at least one of said groove flanks at least one supporting element operable in response to the clamping of said rail against said abutment means precluding all play automatically to be clamped against said at least one groove flank.

2. A saw according to claim 1, which includes spring means continuously urging said at least one supporting element in the direction toward its starting position from which it is moved in response to clamping said rail against said abutment means.

3. A motor driven hand saw especially motor chain saw, which comprises a guiding rail with a guiding groove extending in the longitudinal direction of said rail, abutment means, clamping means for clamping said rail against said abutment means in a direction transverse to the plane of said rail, and counter guiding means associated with said abutment means for cooperation with the flanks of said guiding groove, said counter guiding means including for at least one of said groove flanks at least one supporting element operable in response to the clamping of said rail against said abutment means automatically to be clamped against said at least one groove flank, said supporting element being pivotally mounted, the pivot axis of said supporting element when viewing in clamping direction being located behind said abutment means for said guiding rail.

4. A saw according to claim 3, in which said pivotally mounted supporting element is provided with a supporting surface and is also provided with a clamping surface arranged at an angle to said supporting surface.

5. A saw according to claim 4, in which said clamping surface is with regard to the pivot axis of said supporting element located radially outside said supporting surface.

6. A saw according to claim 4, in which said clamping surface is located in that region of said guiding rail which is adjacent to said guiding groove.

7. A saw according to claim 3, in which the two groove flanks of said guiding groove have respectively associated therewith at least one supporting element.

8. A saw according to claim 4, in which said supporting element is formed by a pivotable strip extending in the longitudinal direction of said guiding groove and in which said abutment means has associated therewith a groove of semicircular cross section, said pivotable strip being guiding in said last mentioned groove and being provided with said clamping surface.

9. A saw according to claim 8, in which said pivotable strip has a mushroom-shaped cross section with a mushroom-shaped head and a foot portion, and in which there is provided a clamping spring acting upon said pivotable strip at the area where said mushroom-shaped head merges with said foot portion, said area being located opposite said clamping surface.

10. A saw according to claim 4, in which one supporting element is formed by a pivotable lever journalled in said abutment means, the pivot axis of said pivotable lever being offset relative to the flank of said guiding groove cooperating with its supporting surface in the direction toward the other flank of said guiding groove.

11. A saw according to claim 10, which includes spring means continuously urging said pivotable lever in the direction toward its starting position.

12. A saw according to claim 3, in which said supporting element is elastically deformable.

13. A saw according to claim 12, in which said supporting element is a part formed of synthetic material.

14. A saw according to claim 12, in which said supporting element is formed by a spring element.

15. A saw according to claim 14, in which said spring element has a U-shaped cross section.

16. A saw according to claim 14, in which said spring element has a leg, and in which that end section of said leg which is associated with the flank of said guiding groove is stepped so as to form said supporting surface and said clamping surface.

17. A saw according to claim 3, in which said supporting element is a double supporting element, and in which said double supporting element is formed by a spreading spring associated with both flanks of said guiding groove.

* * * * *

UNITED STATES PATENT OFFICE
CERTIFICATE OF CORRECTION

Patent No. 4,026,020  Dated May 31, 1977

Inventor(s) Klaus Hoppner et al.

It is certified that error appears in the above-identified patent and that said Letters Patent are hereby corrected as shown below:

[30] Foreign Application Priority Data

Mar. 5, 1975   Germany ..............2509158 should read

[30] Foreign Application Priority Data

Mar. 5, 1975   Germany ..............2509518

Signed and Sealed this

Twenty-seventh Day of September 197

[SEAL]

Attest:

RUTH C. MASON  
Attesting Officer

LUTRELLE F. PARKER  
Acting Commissioner of Patents and Trademark